No. 847,116. PATENTED MAR. 12, 1907.
H. W. RUSSELL.
SAD IRON HEATER.
APPLICATION FILED NOV. 28, 1906.
2 SHEETS—SHEET 1.
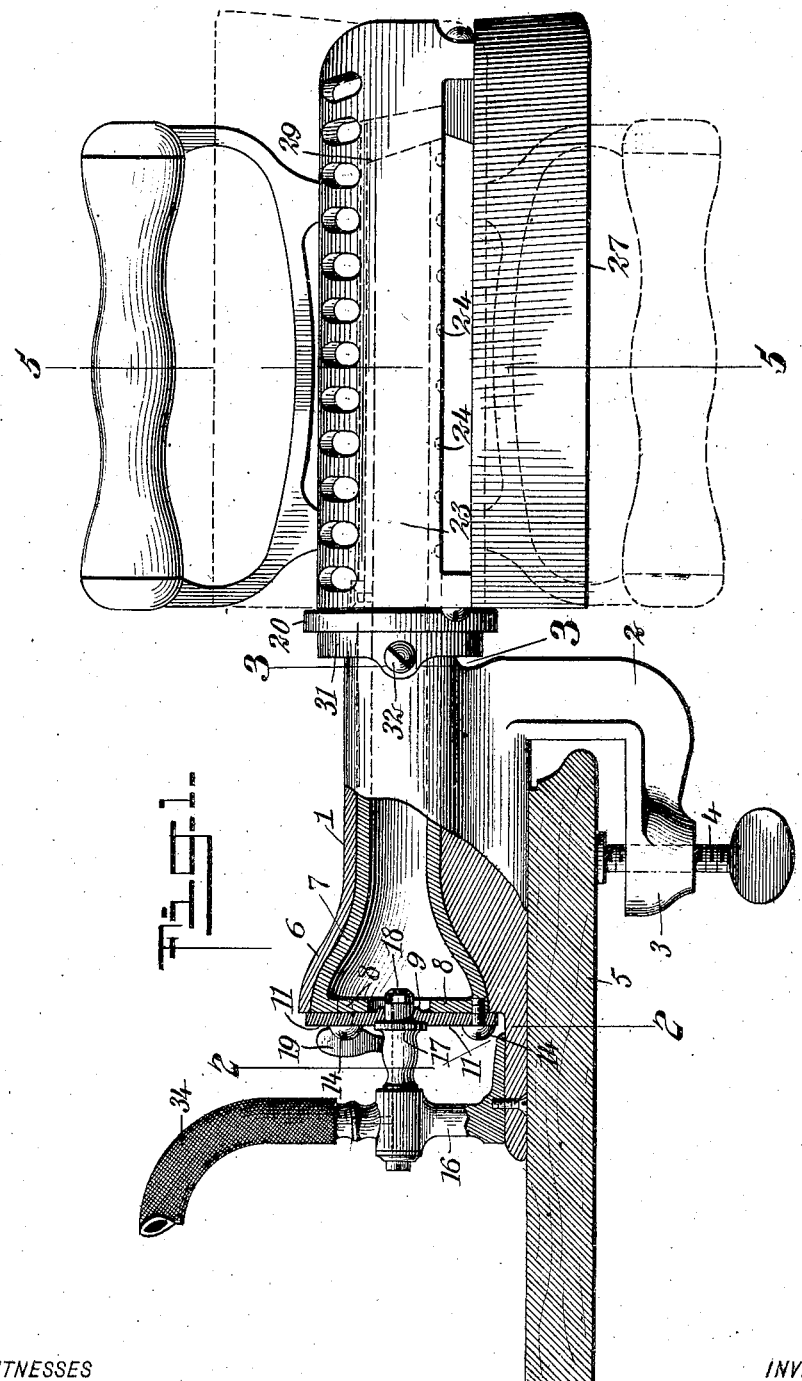
WITNESSES
INVENTOR
Halsey W. Russell
BY
ATTORNEYS No. 847,116. PATENTED MAR. 12, 1907.
H. W. RUSSELL.
SAD IRON HEATER.
APPLICATION FILED NOV. 28, 1906.
2 SHEETS—SHEET 2.
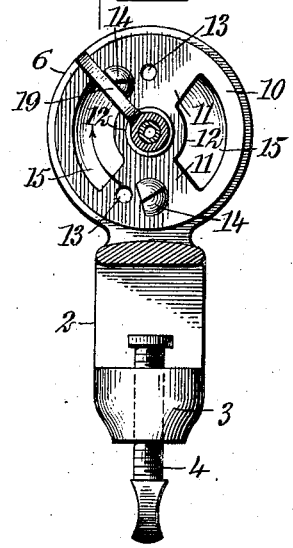
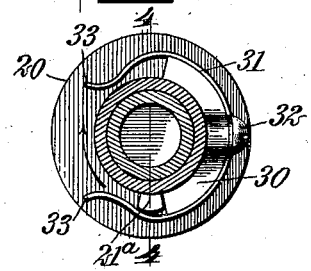
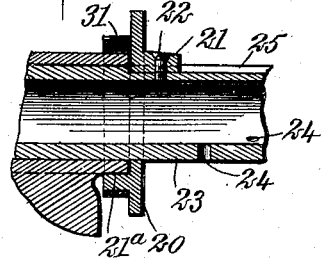
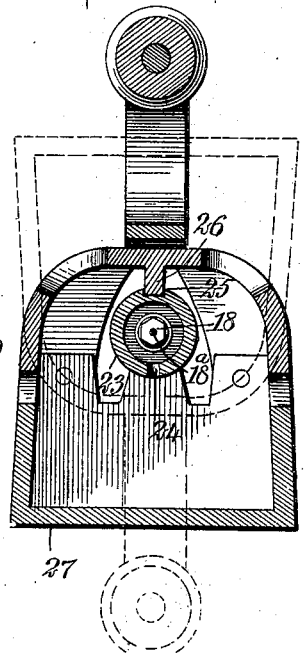
WITNESSES
INVENTOR
Halsey W. Russell
BY
ATTORNEYS

UNITED STATES PATENT OFFICE.

HALSEY W. RUSSELL, OF MANCHESTER, NEW HAMPSHIRE.

SAD-IRON HEATER.

No. 847,116.　　　　　Specification of Letters Patent.　　　Patented March 12, 1907.

Application filed November 28, 1906. Serial No. 345,443.

*To all whom it may concern:*

Be it known that I, HALSEY W. RUSSELL, a citizen of the United States, and a resident of Manchester, in the county of Hillsboro and State of New Hampshire, have invented a new and Improved Sad-Iron Heater, of which the following is a full, clear, and exact description.

This invention relates to heaters designed to heat sad-irons, and has for its object to provide a gas-heater which is simple in construction, effective in operation, adapted to be used with the least possible expenditure of gas, to render the use thereof absolutely safe under all conditions, and to enable the heater to be used without generating the offensive odor common to devices heretofore used for the same general purpose.

Such objects I accomplish by the means illustrated in the accompanying drawings, in which drawings like characters of reference indicate like parts throughout the views, and in which—

Figure 1 is a central longitudinal section, partly in side elevation, of a device embodying my invention, with a sad-iron shown in side elevation attached thereto. Fig. 2 is a vertical section of the device shown in Fig. 1, taken on the line 2 2 of said figure. Fig. 3 is a vertical cross-section taken on the line 3 3 of Fig. 1. Fig. 4 is a vertical cross-section taken on the line 4 4 of Fig. 3. Fig. 5 is a vertical cross-section taken on the line 5 5 of Fig. 1. Fig. 6 is a side elevation of the end of the heater, and Fig. 7 is a plan view of the part shown in Fig. 6.

As illustrated in the drawings, the main frame or casing 1 of the heater is provided with a clamp 2, having an offset arm 3, which is provided with a fastening thumb-screw 4, adapted to be attached to the ledge of a table 5 or other suitable object, so as to hold the heater fixedly secured in position. The back end 6 of the main frame is flared or made conical in outline and adapted to receive a correspondingly-shaped head of a sleeve 7, which is rotatably mounted in the casing 1. The end of the sleeve is provided with sector-plates 8, spaced at their inner ends, so as to form a central aperture 9 in the end of the sleeve shown in Fig. 1, and otherwise corresponding in general outline with an adjusting-plate 10, secured to the end of said sleeve, as shown in Fig. 2. The adjusting-plate 10 is provided with sector-plates 11, which are connected together at their inner ends by means of a central disk 12. The adjusting-plate 10 is also provided with apertures 13, by means of which and the engaging-screws 14 the plate 10 may be adjusted on the end of the sleeve, so as to reduce the area of the openings 15, formed in said plate and in the end of the sleeve on opposite sides of the sector-plates 8 and 11, respectively.

The flaring end of the sleeve forms a mixing-chamber, and by adjusting the plates 11 on the end of the sleeve, so as to regulate the extent of the apertures 15 formed therein, the supply of air passing into the mixing-chamber is thereby regulated. A gas-cock 16 is fixedly secured to the main frame of the heater and is provided with a shank 17, the end of which extends through the adjusting-plate 10 and end of the sleeve and is provided on its inner end with a tip 18, (shown in Figs. 1 and 5,) which is provided with an orifice 18$^a$, adapted to supply gas to the mixing-chamber. The tip 18 is adjustably secured to the shank of the said gas-cock, so that tips having orifices of different diameters may be applied thereto to compensate for the pressure in the mains and in the pipes to which the burner is connected. The shank of the gas-cock is provided with a controlling-lever 19, which is arranged in line with the heads of the screws 14, so that when the sleeve is rotated one of the screws 14 will come in contact with the controlling-lever 19 of the gas-cock and shut off or turn on the supply of gas to the mixing-chamber in accordance with the direction in which the sleeve is rotated in the casing or main frame 1. The sleeve 7 may be provided with a collar 20, fixedly secured thereto in any suitable manner, preferably by means of a lip 21, formed on said collar, which is detachably secured by means of a screw 22 to a burner 23, formed integral with the sleeve 7 and extending from the end of the main frame or casing outward. The burner 23 is provided on one side with orifices 24 and on the opposite side with a longitudinal groove 25, adapted to engage a projection 26, formed on the upper portion of a sad-iron 27, as shown in Fig. 5.

The burner 23 is provided with a reduced end 28, having substantially parallel sides and an inclined edge 29, adapted to engage a corresponding aperture formed in the front end of a sad-iron, as indicated by dotted lines in Fig. 1. The collar 20 is provided with a lug 21$^a$, (shown in Figs. 3 and 4,) which is adapted to bear against a sector-flange 30, formed on the main frame or casing of the burner, as shown in Fig. 3. A circular spring 31 is secured to the flange 30 by means of a set-screw 32 and is provided with offset ends 33, adapted to retain the lug 21ª in contact with the end of the sector-flange 30, as shown in Fig. 3, so as to lock or retard the rotary motion of the burner relatively to the main frame.

When the device is in operation, the burner is attached to a table, shelf, or other object in the manner already described and is connected to a supply-pipe by means of a flexible tube 34, which supplies gas to the burner. A sad-iron is applied to the burner when the groove 25, formed therein, is arranged uppermost. When in such position, the orifices 24 of the burner are arranged at the lower portion of the burner, as shown in Fig. 1, and the supply of gas to the burner is reduced, so as to merely keep the burner lighted. After the sad-iron has been thus applied to the burner the iron is turned through half a revolution, and by means of the locking connection with the burner hereinbefore described the burner and sleeve, formed integral therewith, are rotated in the casing through half a revolution, and during such rotary movement of the sleeve the studs or screw-heads 14 come in contact with the operating-lever 19 and open the gas-cock, so as to allow the full supply of gas to be admitted to the mixing-chamber and burner. When the sad-iron has been rotated in the manner described and the gas turned on to its full extent, the orifices 24 and the flames extending therefrom are arranged at the upper portion of the burner, and the sad-iron is supported on the burner bottom side up, as indicated by dotted lines in Fig. 1. After the iron has been sufficiently heated the operation is reversed and the iron turned through half a revolution, which brings the handle of the iron uppermost, as shown in Fig. 1, at the same time partially rotating the burner and sleeve formed integral therewith, so as to shut off the supply of gas to its minimum limit, and the sad-iron may then be readily removed from the burner and used.

While the sad-iron is on the heater it is held against lateral or rotary displacement on the heater by means of the lug 25, engaging a longitudinal groove formed on the heater on the side opposite to the orifices 24. In addition to locking the sad-iron against rotary motion on the burner said interlocking means furnishes a guideway for the sad-iron when being applied to or removed from the burner.

The construction and arrangement of the device, therefore, is such that when the iron is removed from the burner the supply of gas is reduced to an amount sufficient to keep the flames alive, and the flames are arranged on the under side of the burner, so as to be safely out of the way of the person using the device. The supply of gas is turned on to its full extent and is operative only when the sad-iron is supported on the burner bottom up.

In the construction herein shown and described I have embodied my invention in a preferred form. I do not desire to be limited to such construction, however, as my invention is generic in its character and includes within its scope other means having similar capabilities. Thus the spring mechanism which locks or retards the burner against rotary motion relatively to the main frame may be of any other suitable construction than that shown and applied to the sleeve or connecting mechanism in any position, and any other suitable form of burner or mixing-chamber may be used with the other features of my device without departing from the scope of my invention.

Having thus described my invention, what I claim as new, and desire to secure by Letters Patent, is—

1. A gas-heater having a main frame, a sleeve rotatably mounted thereon and provided with a mixing-chamber, a burner connected with said sleeve and provided with discharge-apertures and a longitudinal guideway arranged opposite to said apertures, and a sad-iron provided on its upper portion with guides adapted to engage said guideway, substantially as shown and described.

2. The combination with a main frame, of a sleeve rotatably mounted thereon, provided with a mixing-chamber and connected with a burner having discharge-orifices, and a guideway arranged opposite to said orifices adapted to engage a guide formed in the upper portion of a sad-iron.

3. The combination with a main frame, of a sleeve rotatably mounted thereon and provided with a mixing-chamber, and atmospheric regulating devices connected therewith, a journal connected with said sleeve and provided with discharge-orifices extending longitudinally of said burner, and means connected with said burner adapted to engage a sad-iron so as to enable said burner to be rotated on the main frame by means of the sad-iron, substantially as shown and described.

4. The combination with a main frame, of a sleeve rotatably mounted thereon and provided with an enlarged head forming a mixing-chamber, a burner connected with said sleeve and provided with apertures extending longitudinally of said burner, and a longitudinal guideway adapted to engage a sad-iron, substantially as shown and described.

5. The combination with a main frame, of a sleeve rotatably mounted thereon and provided with an enlarged head forming a mixing-chamber, a burner connected with said sleeve and provided with apertures extending in a longitudinal line, and a reduced end adapted to engage a sad-iron and lock said iron against rotary motion on said burner, substantially as shown and described.

6. The combination with a main frame, of a sleeve rotatably journaled thereon and provided with an enlarged head forming a mixing-chamber, a burner connected with said sleeve and provided with orifices extending in a longitudinal line, and a spring-clamp adapted to lock said sleeve in engagement with the main frame, substantially as shown and described.

7. The combination with a main frame, of a sleeve rotatably mounted thereon and provided with an enlarged head forming a mixing-chamber, a burner connected with said sleeve and provided with apertures extending in a longitudinal line, and with means adapted to engage the main frame and limit the rotary motion of said sleeve on the main frame, substantially as shown and described.

8. The combination with a main frame, of a sleeve rotatably mounted thereon and provided with an enlarged head, a burner connected with said sleeve and provided with apertures extending in a longitudinal line and means adapted to engage the upper portion of a sad-iron and hold said iron against rotary motion on the burner, a regulating-plate adjustably secured to the end of said sleeve, and a gas-cock connected with the main frame provided with means adapted to be controlled by the rotation of the sleeve in the main frame, substantially as shown and described.

9. The combination with a main frame, of a sleeve rotatably mounted thereon and provided with an enlarged head forming a mixing-chamber, and with segmental end plates, an adjusting-plate secured to the segmental plates of the sleeve and provided with openings adapted to register with the openings in the end of said sleeve, a supply-cock connected with the main frame, means connected with said adjusting-plate adapted to operate said cock and a burner connected with said sleeve and provided with discharge-orifices, and an oppositely-disposed guideway adapted to engage the upper portion of a sad-iron, substantially as shown and described.

10. In a gas-burner, the combination with a main frame, of a sleeve rotatably mounted thereon and provided with an enlarged head forming a mixing-chamber, a supply-cock freely connected with said sleeve and adapted to be operated by the rotary movement of said sleeve and a burner connected with said sleeve and provided with discharge-apertures arranged in a longitudinal line, and interlocking mechanism arranged on the opposite side of said sleeve adapted to engage the upper portion of a sad-iron, substantially as shown and described.

11. The combination with a main frame, of a sleeve rotatably mounted thereon, provided with an enlarged head forming a mixing-chamber, an adjusting-plate secured to the end of said sleeve, supply-cock loosely connected with said plate and provided with a detachable tip extending into the interior of said mixing-chamber and a burner connected with said sleeve provided with discharge-orifices extending in a longitudinal line, and with interlocking means adapted to engage a sad-iron and hold said iron against rotary motion on said burner, substantially as shown and described.

12. A sad-iron heater having a supply-valve, a rotatable burner operatively connected with said valve and provided with discharge-orifices, and with means adapted to engage a sad-iron, substantially as shown and described.

In testimony whereof I have signed my name to this specification in the presence of two subscribing witnesses.

HALSEY W. RUSSELL.

Witnesses:
MINOT T. PHELPS,
ARTHUR W. CHASE.